(12) United States Patent
Kodama (10) Patent No.: US 6,471,093 B1
(45) Date of Patent: Oct. 29, 2002

(54) TABLET FEEDER (75) Inventor: Tsuyoshi Kodama, Toyonaka (JP)

(73) Assignee: Yuyama Mfg. Co., Ltd., Toyonake (JP)

( * ) Notice: Subject to any disclaimer, the term of this patent is extended or adjusted under 35 U.S.C. 154(b) by 21 days.

(21) Appl. No.: 09/679,640

(22) Filed: Oct. 5, 2000

(30) Foreign Application Priority Data

Oct. 6, 1999 (JP) .......................................... 11-285487

(51) Int. Cl.[7] .............................................. B65G 59/00
(52) U.S. Cl. ...................................... 221/266; 221/277
(58) Field of Search .......................... 221/2, 7, 13, 82, 221/171, 172, 266, 265, 277; 111/71, 77

(56) References Cited

U.S. PATENT DOCUMENTS

| 3,045,864 A | | 7/1962 | Hurst et al. | |
|---|---|---|---|---|
| 4,869,394 A | | 9/1989 | Hurst | |
| 5,860,563 A | * | 1/1999 | Guerre et al. | ............... 221/172 |
| 6,269,971 B1 | * | 8/2001 | Nystrom et al. | ............... 221/13 |

FOREIGN PATENT DOCUMENTS

| JP | 2-23401 | 5/1990 |
|---|---|---|
| JP | 6-8902 | 1/1994 |
| JP | 2536395 | 2/1997 |
| JP | 2560706 | 10/1997 |

* cited by examiner

Primary Examiner—Kenneth W. Noland
(74) Attorney, Agent, or Firm—Wenderoth, Lind & Ponack, L.L.P.

(57) ABSTRACT

Tablets T contained in a feeder vessel 2 are discharged through a feed port 7 by rotating a rotor 8 provided on the bottom of a feeder vessel 2. The bottom of the feeder vessel 2 is upwardly inclined toward the feed port 7 side. The rotor 8 has a disc-like shape and the outer periphery of the rotor 8 is formed with a substantially U-shaped cutout portion 9. The cutout portion 9 and the bottom of the feeder vessel 2 define a retaining portion 10 for retaining only one of the tablets T. Thus, the tablet feeder is capable of automatically feeding tablets, particularly half-tablets, with a simple and low-cost construction.

7 Claims, 7 Drawing Sheets

TABLET FEEDER

BACKGROUND OF THE INVENTION

The present invention relates to a tablet feeder, in particular to a tablet feeder used for automatically feeding half-tablets obtained by cutting a tablet into two.

Conventionally, a tablet feeder in which tablets contained in a feeder vessel are discharged through a feed port has been known (refer to, for example, Japanese Utility Model Registration No. 2,560,706 and No. 2,536,395, Japanese Laid-Open Patent Publication No. 6-8,902 and U.S. Pat. No. 4,869,394).

Such tablet feeder has not been suitable for discharging half-tablets obtained by cutting a tablet into two. Then, a manual distributor has been provided separately from the tablet feeder, wherein the half-tablets are prepared on a tray of the manual distributor (refer to Japanese Patent Publication No. 2-23,401).

Another tablet feeder in which a rotor is obliquely provided in a feeder vessel so that a tablet is retained between a through hole formed in the rotor and a bottom of the feeder vessel has been known (refer to, for example, U.S. Pat. No. 3,045,864). In the tablet feeder, when the rotor is rotated and the through hole comes at a discharge passage, the tablet can be discharged.

However, as in the former, providing the manual distributor separately from the tablet feeder makes the structure complicated and incurs high cost. Moreover, preparation of the half-tablets on the manual distributor must be done by troublesome manual work. Thus, automation of feeding the half-tablets has been desired.

As in the latter, forming a retaining portion, i.e. the through hole in the rotor so as to adapt it to the shape of the tablet needs different rotors with respect to every different shape of tablets, resulting in a lack of versatility and practicality.

SUMMARY OF THE INVENTION

Therefore, it is an object of the present invention to provide a tablet feeder capable of automatically feeding tablets and having a simple and low-cost construction and excellent versatility.

As a means to solve the problem, the present invention provides a tablet feeder for discharging tablets contained in a feeder vessel through a feed port by rotating a rotor provided on the bottom of the feeder vessel. The bottom of the feeder vessel is upwardly inclined toward the feed port side. The rotor has a disc-like shape, and the outer-periphery of the rotor is formed with a substantially U-shaped cutout portion. The cutout portion and the bottom of the feeder vessel define a retaining portion for retaining only one of the tablets.

The inner edge of the cutout portion positioned at the upstream side with respect to the rotational direction of the rotor may comprise a projection, the height of which is substantially the same as the thickness of the tablet, while the inner edge of the cutout, positioned in the radial direction of the rotor, may have a thickness less than the thickness of the tablet.

The inner edge of the cutout portion positioned at the upstream side with respect to the rotational direction of the rotor may have a thickness substantially the same as the thickness of the tablet, while the inner edge of the cutout positioned in the radial direction of the rotor may comprise an inclined surface which is downwardly inclined toward the inside with respect to the radial direction of the rotor.

In the construction of the present invention, the tablets are contained in the feeder vessel. When the rotor is rotated, only one of the tablets retained in the retaining portion of the rotor is conveyed to the feed port. Among the opposite edges of the cutout portion constituting the retaining portion, the inner edge positioned at the upstream side with respect to the rotational direction of the rotor prevents the tablet from being disengaged from the retaining portion. Therefore, the tablets which are in a non-retained condition, as the rotor rotates, disengage from the retaining portion before reaching the feed port due to the inclination of the rotor. At this time, due to the inner edge of the cutout positioned in the radial direction of the rotor, disengaging of the tablets which are in a non-retained condition and discharging of the tablets which are in a retained condition through the feed port are more adequately conducted.

As a means to solve the problem, the present invention provides a tablet feeder for discharging tablets contained in a feeder vessel through a feed port by rotating a rotor provided on the bottom of the feeder vessel. The rotor has a retaining portion for retaining the tablet on the outer periphery of the rotor and is provided with a conveyance regulation means capable of conveying only the tablet retained in the retaining portion to the feed port.

This construction, in the same manner as described above, can prevent the tablets other than the tablets retained in the retaining portion from being discharged through the feed port.

The retaining portion may be provided with a plurality of projections on the outer periphery of the rotor at a predetermined distance so that a straight portion of a half-tablet can be abutted against the bottom of the rotor and retained between the projections. The conveyance regulation means may comprise a cover fixedly provided so as to cover the upper half portion of the rotor except the retaining portion and the outer peripheral portion of the cover may be formed with an inclined surface, which is gradually inclined toward the retaining portion.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Hereinafter, embodiments according to the present invention will be explained in accordance with the accompanying drawings.

Figure 1:
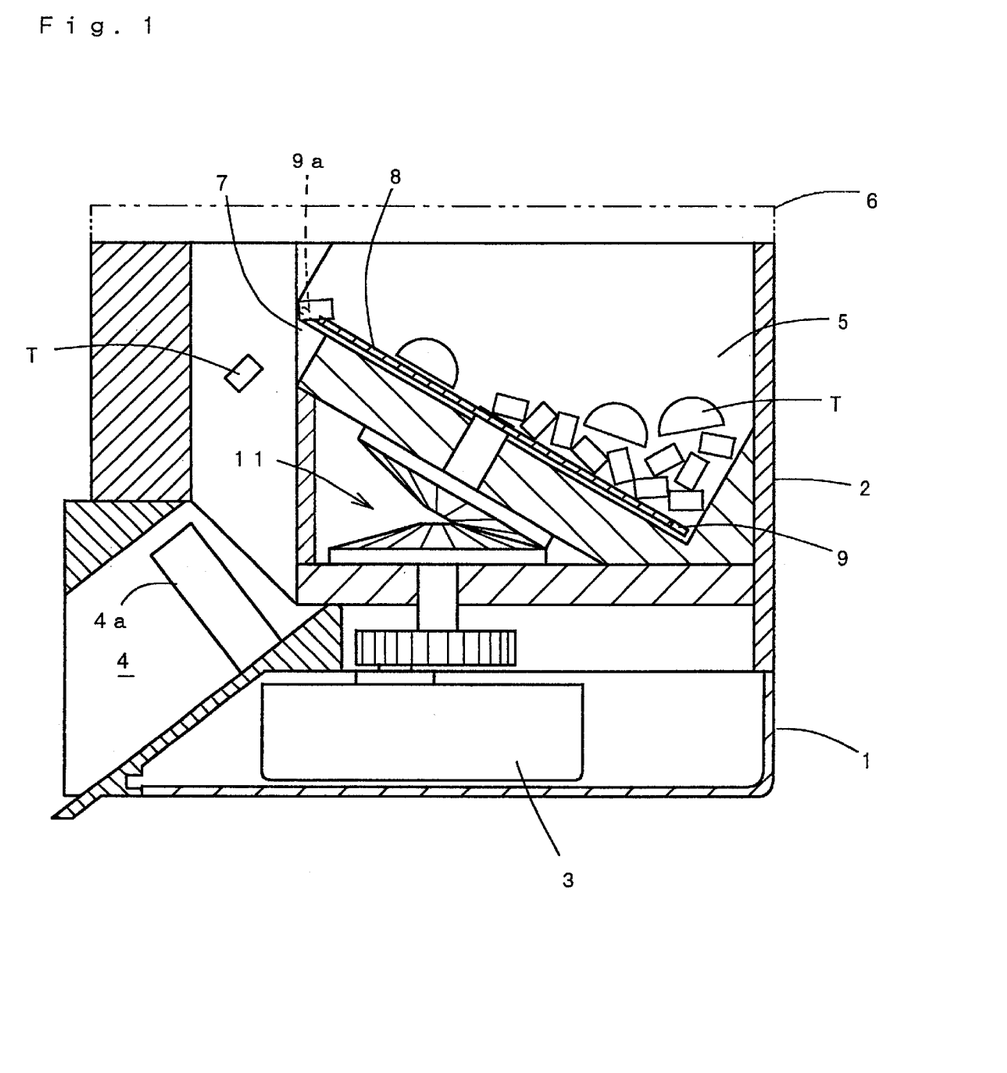
FIG. 1 is a sectional view of a tablet feeder according to a first embodiment of the present invention.
Figure 2:
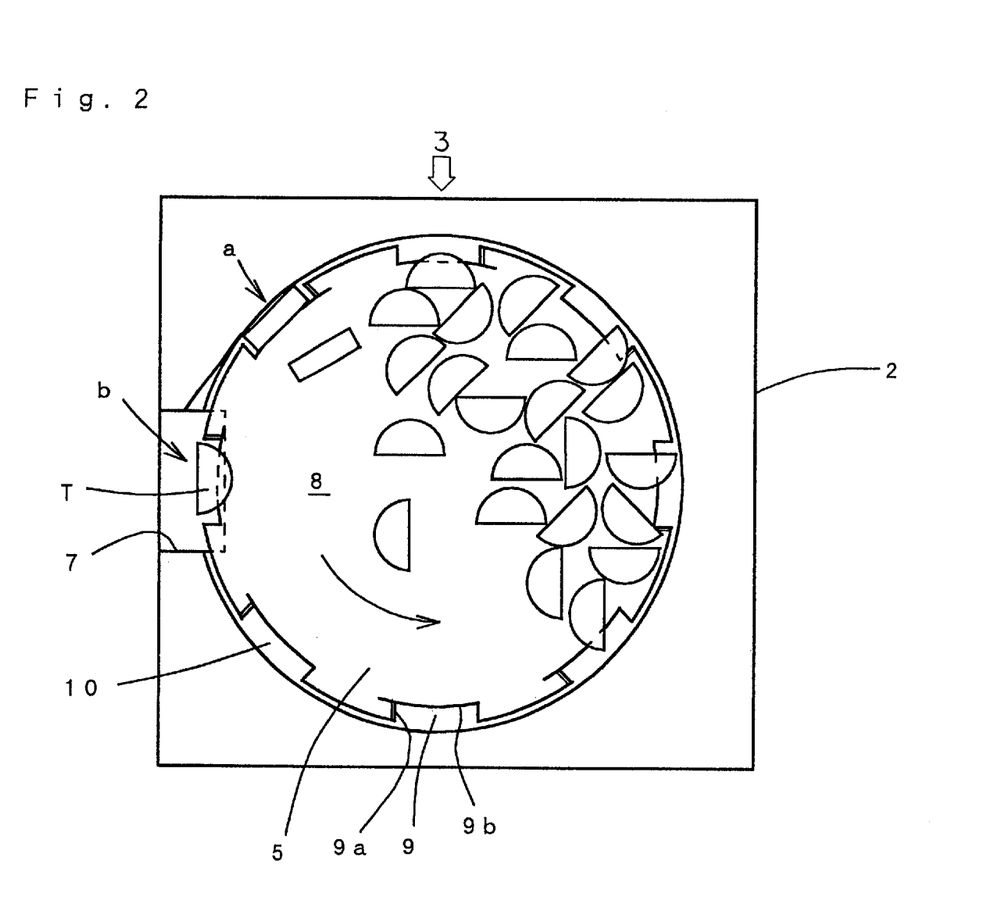
FIG. 2 is a view showing a bottom portion of a feeder vessel of the tablet feeder of FIG. 1.

FIG. 1 shows a tablet feeder according to a first embodiment. The tablet feeder comprises a motor base 1 and a feeder vessel 2 detachably mounted on the motor base 1.

The motor base 1 includes a motor for rotatably driving a rotor 8 in the feeder vessel 2. The motor base 1 is provided with a drop guide passage 4 for guiding a tablet T (in this embodiment, the tablet T means a half-tablet obtained by cutting a tablet along a split groove formed at the center thereof discharged from the feeder vessel 2. A plurality of the motor bases 1 are to be arranged on a medicament packing apparatus not shown and vertically laterally aligned with each other.

The feeder vessel 2 has a substantially rectangular parallelepiped shape and is formed with a tablet-containing chamber 5 inside thereof. In each tablet-containing chamber 5 are contained different kinds of the half-tablets T. The upper opening portion of the tablet-containing chamber 5 is closed by a removable cover 6.

Figure 3:
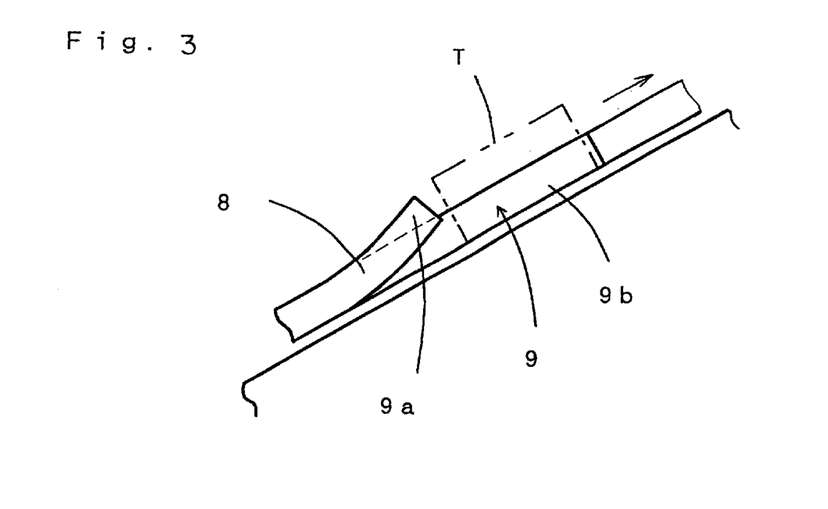
FIG. 3 is a view looking from the direction indicated by arrow 3 of FIG. 2.
Figure 4:
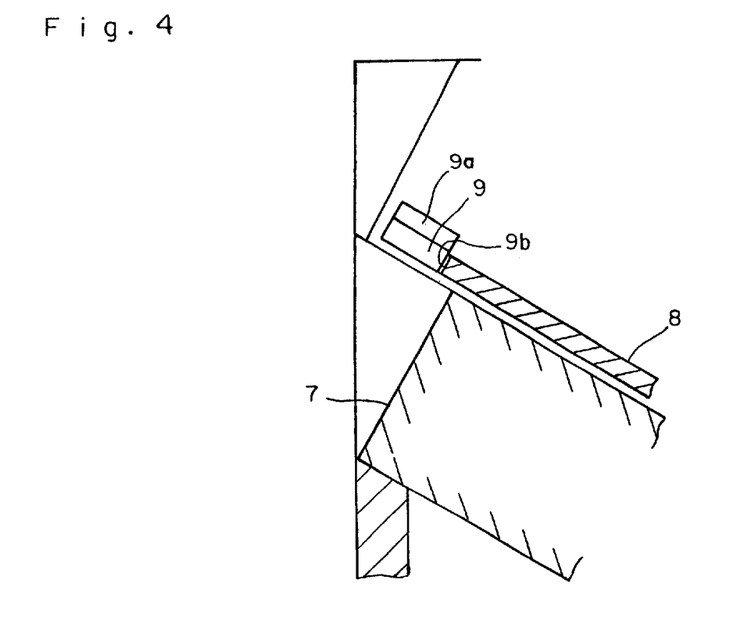
FIG. 4 is an enlarged sectional view showing the vicinity of a feed port of the tablet feeder of FIG. 1.

The bottom of the tablet-containing chamber 5 is gradually upwardly inclined toward a feed port 7 formed on a lateral face thereof. The feed port 7 is formed so that the bottom of the tablet-containing chamber 5 is partly cut off. When the half-tablet T retained in a retaining portion described hereinafter is conveyed to the feed port 7, the half-tablet T can drop in the drop guide passage 4 through the feed port 7. The bottom surface of the tablet-containing chamber 5 is covered by a rotor 8 which is rotatably provided. The rotor 8 has a shape of a thin circular plate. The outer periphery of the rotor 8 is formed with substantially U-shaped cutouts 9 at a predetermined pitch of angle. The distance between opposite edges of each cutout 9 is wider than the length of the straight portion of the half-tablet T. Both the cutout 9 and the bottom of the tablet-containing chamber 5 define a retaining portion 10 according to the present invention. Among the opposite edges of each cutout 9, the inner edge positioned at the upstream side with respect to the rotational direction of the rotor 8 is bent to form an upwardly protruding projection 9a as shown in FIG. 3. The height of the projection 9a is substantially the same as the thickness of the half-tablet T. In spite of the inclination of the bottom of the tablet containing chamber 5, the projection 9a prevents only the half-tablet T retained in proper position as described hereinafter from disengaging from the retaining portion as described hereinafter. The thickness of the rotor 8 is less than substantially half of the thickness of the half-tablet T. The thickness of the inner edge 9b of the cutout 9 positioned at the inner side in the radial direction is also less than substantially half of the thickness of the half-tablet T. Therefore, at the time that the half-tablet T, which is not properly retained in the retaining portion 10 arrives at the feed port 7, if the center of gravity of the half-tablet T is at the side of feed port 7, the half-tablet T drops to the side of tablet-containing chamber 5 due to the inner edge 9b of the cutout 9 positioned at the inner side in the radial direction. Thus, two half-tablets T are surely prevented from being simultaneously discharged from the feed port 7.

The rotor 8 is connected through a plurality of gears 11 to the motor 3 in the motor base 1. Drive of the motor 3 causes the rotor to rotate, whereby the half-tablets T contained in the feeder vessel 2 are discharged through the drop guide passage 4 one after another.

Next, operation of the tablet feeder having above construction will be explained.

The above tablet feeder is constructed, in the same manner as in that described in the discussion of the prior art, by mounting the feeder vessel 2 on the motor base 1 arranged on the tablet feed section of the medicament packing apparatus. Therefore, it needs no new apparatus and can utilize existent equipment, which does not make the structure complicated and avoids high costs.

In each feeder vessel 2 are contained different kinds of half-tablets T respectively. In accordance with a prescription information or an input signal, the corresponding half-tablets T are discharged one after another. Specifically, when the prescription information or so is inputted, the motor 3 of the corresponding tablet feeder is driven to rotate the rotor 8. Among the half-tablets T in the tablet containing chamber, only ones which are in a retained condition in the retaining portion 10 of the rotor 8 are conveyed and fed from the feed port 7. The retained condition means both a condition that the straight portion of the half-tablet T abuts against the bottom of the feeder vessel 2 (shown by "a" in FIG. 2) and a condition that the straight portion of the half-tablet T is positioned at the side of outer periphery (shown by "b" in FIG. 2). That is to say, only when one end of the straight portion of the half-tablet T engages with the projection 9a, which is formed in the inner edge positioned at the upstream side with respect to the rotational direction of the rotor 8 among the opposite edges of each cutout 9, the half-tablet T does not disengage from the retaining portion 10 due to the inclination of the rotor 8. Such half-tablet T, when the rotor 8 rotates and each retaining portion 10 (or the cutout 9) arrives at the feed port 7, loses support by the bottom of the feeder vessel 2, and is discharged through the feed port 7 due to gravity. Other half-tablets T, for example, ones that overlie the other or ones that the semicircle portion is positioned at the side of outer periphery, as the rotor 8 rotates, surely disengage from the retaining portion 10 before reaching the feed port 7 due to the inclination of both the bottom of the tablet-containing chamber 5 and the rotor 8 or the presence of the inner edge 9b of the cutout 9 of the rotor 8. The number of the half-tablets T discharged through the feed port 7 are counted by a sensor 4a when passing through the drop guide passage 4. If the count reaches the predetermined number, driving of the motor 3 is stopped.

Figure 5:
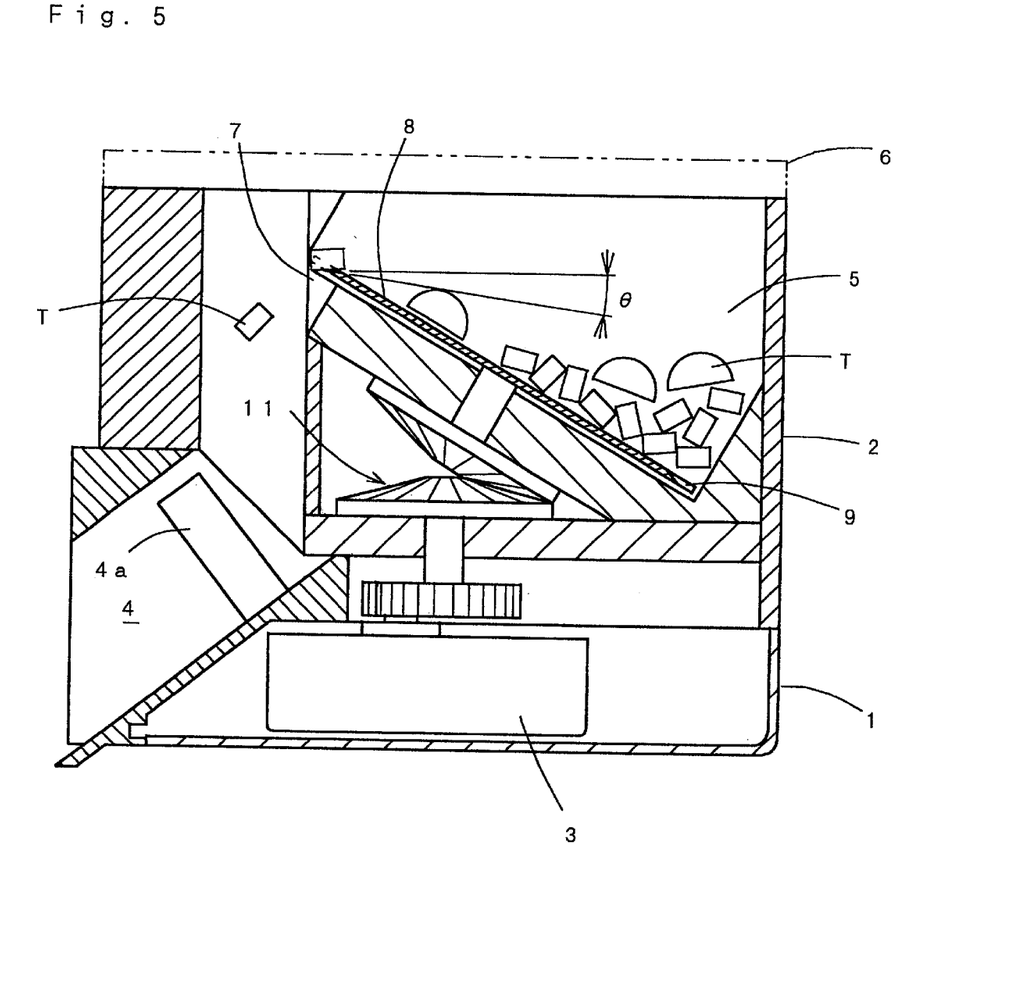
FIG. 5 is a sectional view of a tablet feeder according to a second embodiment of the present invention.

In the above embodiment, although a tablet support portion to be formed in the rotor 8 is defined by the projection 9a and a tablet drop portion is defined by the inner edge 9b, these portions may be defined as shown in FIG. 5.

Figure 6:
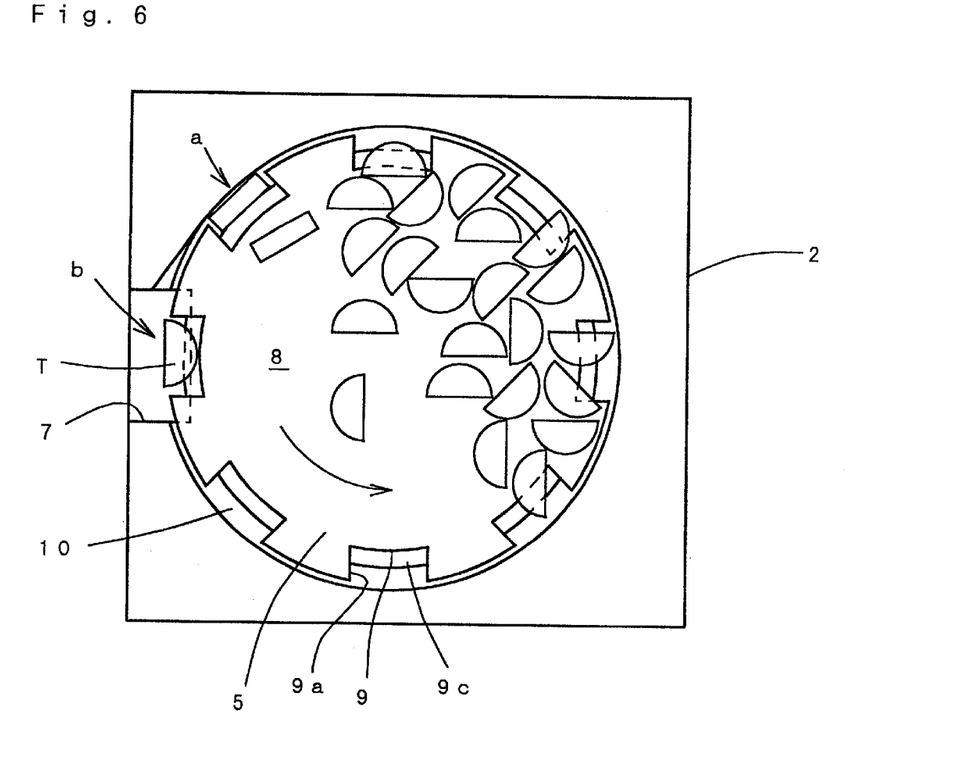
FIG. 6 is a view showing a bottom portion of a feeder vessel of the tablet feeder of FIG. 5.
Figure 7:
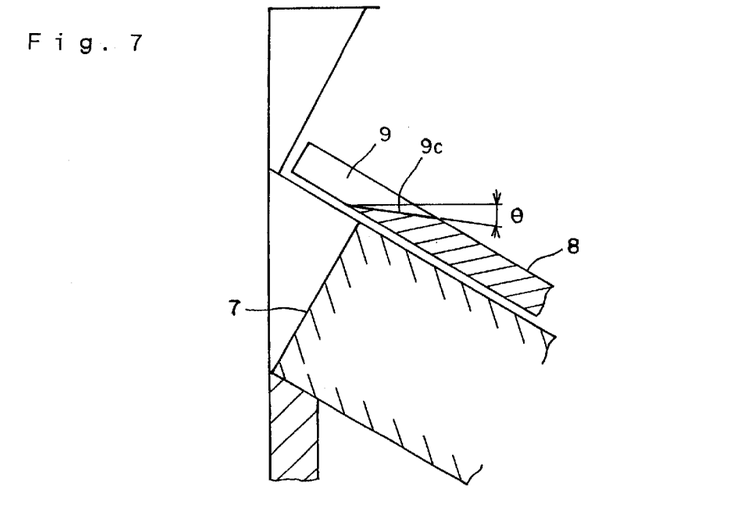
FIG. 7 is an enlarged sectional view showing the vicinity of a feed port of the tablet feeder of FIG. 5.

That is to say, the thickness of the rotor 8 is substantially the same as that of the half-tablet T. Among the opposite edges of each cutout 9, the inner edge 9a positioned at the upstream side with respect to the rotational direction of the rotor 8 is also substantially the same as that of the half-tablet T. Moreover, the inner edge of the cutout 9 positioned at the inner side in the radial direction is formed with an inclined surface 9c. The inclined surface 9c is formed so that the inclination thereof is a predetermined angle θ (preferably more than 0 degree, in the present embodiment approximately 15 degrees) with respect to the plane when the cutout 9 is positioned at the feed port 7. This is because making it possible to disengage the half-tablet T of which the center of gravity is not at the side of feed port 7 from the retaining portion 10 when the half-tablet T, which is in a retained condition in the retaining portion 10 arrives at the feed port 7. Thus, two half-tablets T are surely prevented from being simultaneously discharged from the feed port 7.

Figure 8:
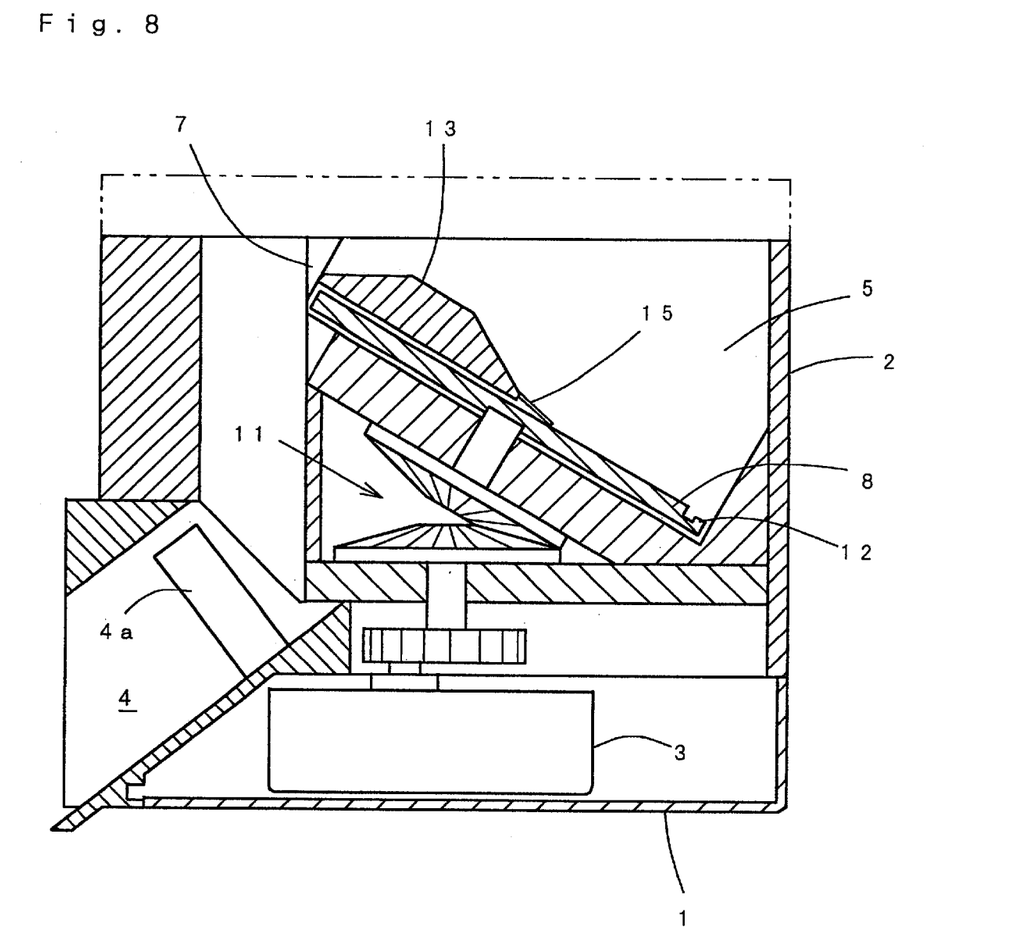
FIG. 8 is a sectional view of a tablet feeder according to a third embodiment of the present invention.

Moreover, instead of the construction of the embodiment described above, it is also possible to adopt a construction as shown in FIG. 8. That is to say, a plurality of projections 12 are provided on the outer periphery of the rotor 8 at a predetermined distance so that the retaining portion 10 is defined by two adjacent projections 12. In each retaining portion 10, the cut portion (straight portion) of the half-tablet T can be retained. However, the retaining portion 10 has such a distance that two half-tablets T cannot be retained.

Figure 9:
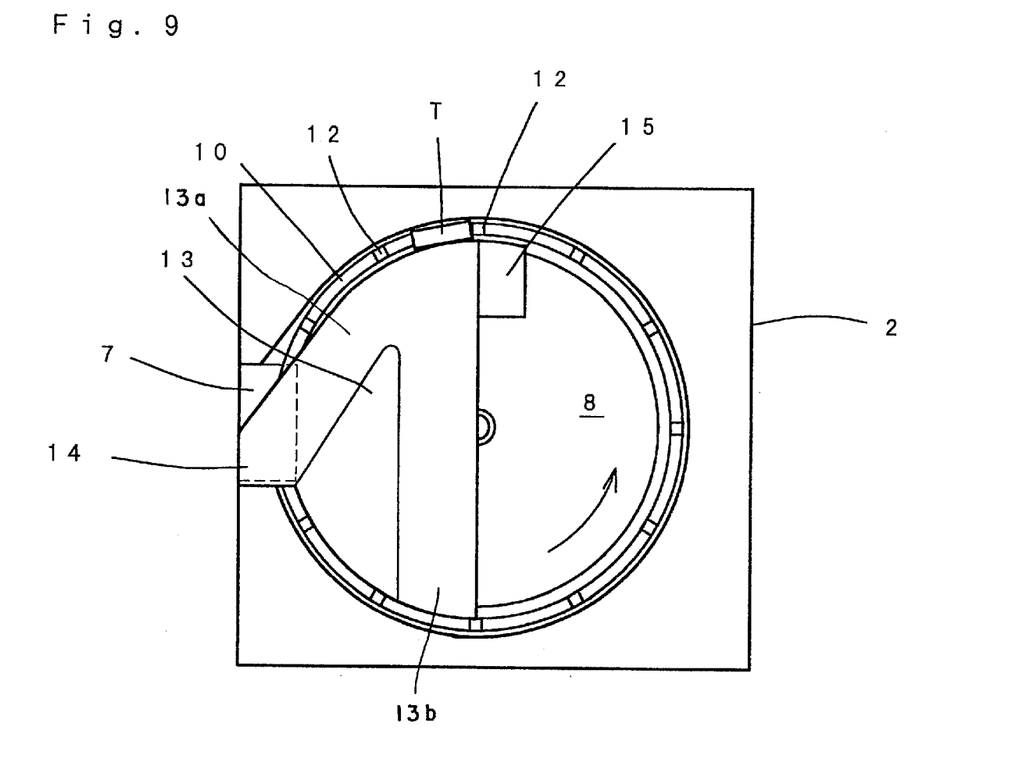
FIG. 9 is a view showing a bottom portion of a feeder vessel of the tablet feeder of FIG. 8.

A cover 13 is fixedly mounted on an upper surface of the rotor 8. The cover 13 serves as a conveyance regulation means in the present invention. The cover 13 is positioned so as to cover the upper half portion of the rotor 8 except at the outer peripheral portion (retaining portion 10) of the rotor 8. The outer periphery edge 13a of the cover 13 from one edge to the feed port 7 is inclined toward the retaining portion 10, whereby as the rotor 8 rotates, the half-tablet T is guided so that the straight portion is retained in the retaining portion 10. The lower edge 13b of the cover 13 is inclined toward the upper surface of the rotor 8, whereby even though the rotor 8 rotates, the half-tablets T other than the half-tablets T retained in the retaining portion 10 are prevented from being conveyed to the feed port 7. A guide portion 14 provided on the outer periphery of the cover 13 protrudes through the feed port 7, whereby the half-tablets T conveyed by the rotation of the rotor 8 are guided to the feed port 7. Moreover, a guide piece 15 is provided on the upstream side of the lower edge of the cover 13 with respect to the rotational direction of the rotor 8. The guide piece 15 smoothly guides the half-tablets T on the upper surface of the rotor 8 to the retaining portion 10 as the rotor 8 rotates.

In the aforementioned embodiments as shown in FIG. 1, FIG. 5 and FIG. 8, although the half-tablets T are fed from the tablet feeder 2, the tablet feeder is also applicable to the cases that feed tablets having a variety of shapes, for example, polygon plate-like shape, disc-like shape, ellipse-like shape, spherical shape, heart-like shape, gourd-like shape or so. That is to say, the aforementioned construction of the retaining portion 10 having the inner edge of the cutout 9 positioned at the upstream side with respect to the rotational direction of the rotor 8 and the inner edge of the cutout 9 positioned at the inner side in the radial direction is advantageous to retain tablets having a variety of shapes, particularly the half-tablet T.

In the aforementioned embodiments as shown in FIG. 8, although the rotor 8 is inclined, it may be inclined at a smaller angle or may be horizontal with a new conveyance regulation means provided. That is to say, a plate-like member or a brush as the conveyance regulation means may be provided adjacent to the feed port 7 so that only the half-tablet T retained in the retaining portion 10 of the rotor 8 can be discharged through the feed port 7.

As will be clear from the above description, according to the tablet feeder of the present invention, the rotor was provided so as to be inclined. The rotor was formed with the substantially U-shaped cutout portion. The cutout portion is provided with the tablet support portion and the tablet drop portion. Thus, only the tablet retained in the retaining portion can be adequately automatically fed through the feed port, eliminating both breakage of the tablet and generation of tablet dust due to abrasion. The tablet feeder of the present invention is also flexibly applicable to tablets having a variety of shapes, resulting in excellent versatility. Moreover, tablet feeder of the present invention does not need any separate apparatus such as a conventional manual distributor, which does not make the structure complicated and avoids high costs.

Although the present invention has been fully described by way of the examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A tablet feeder for discharging tablets contained in a feeder vessel through a feed port by rotating a rotor provided on the bottom of the feeder vessel, wherein the bottom of the feeder vessel is upwardly inclined toward the feed port side, the rotor having a disc-like shape, the outer periphery of the rotor being formed with a substantially U-shaped cutout portion, the cutout portion and the bottom of the feeder vessel defining a retaining portion for retaining only one of the tablets.

2. A tablet feeder as in claim 1, wherein the inner edge of the cutout portion, positioned at the upstream side with respect to the rotational direction of the rotor, comprises a projection the height of which is substantially same as the thickness of the tablet, while the inner edge of the cutout, positioned in the radial direction of the rotor, has a thickness less than the thickness of the tablet.

3. A tablet feeder as in claim 1, wherein the inner edge of the cutout portion, positioned at the upstream side with respect to the rotational direction of the rotor, has a thickness substantially same as the thickness of the tablet, while the inner edge of the cutout, positioned in the radial direction of the rotor, comprises an inclined surface which is downwardly inclined toward the inside with respect to the radial direction of the rotor.

4. A tablet feeder for discharging tablets, the tablet feeder comprising:
    a feeder vessel including a feed port provided in a side of the feeder vessel and a bottom, which is upwardly inclined toward the side of the feed vessel that includes the feed port; and
    a rotor rotatably disposed on the bottom of the feeder vessel, wherein the rotor comprises a retaining portion for retaining a tablet on an outer periphery of the rotor, and the rotor is provided with a conveyance regulation means that is capable of permitting only the tablet, retained in the retaining portion, to be conveyed to the feed port.

5. A tablet feeder as claimed in claim 4, wherein the retaining portion is provided with a plurality of projections on the outer periphery of the rotor, the projections being spaced at a predetermined distance so that a straight portion of a half-tablet can be retained between the projections, and wherein the conveyance regulation means comprises a cover fixedly provided so as to cover the upper half portion of the rotor except the retaining portion, the outer periphery of the cover being formed with an inclined surface which is gradually inclined toward the projections.

6. A tablet feeder as claimed in claim 4, wherein the retaining portion comprises a plurality of projections spaced along the outer periphery of the rotor, the projections being spaced such that a straight portion of a half-tablet can be retained between two of the projections that are adjacent to each other.

7. A tablet feeder as claimed in claim 4, wherein the conveyance regulation means comprises a cover positioned so as to cover an upper portion of the rotor except an outer peripheral portion of the rotor which includes the retaining portion, and wherein a peripheral portion of the cover is formed with an inclined surface that is gradually inclined toward the retaining portion.

* * * * *